(12) United States Patent
Park

(10) Patent No.: US 10,566,825 B2
(45) Date of Patent: Feb. 18, 2020

(54) WIRELESS POWER TRANSFER SYSTEM HAVING WIRELESS POWER TRANSFER SYSTEM-CHARGER

(71) Applicant: LG INNOTEK CO., LTD., Seoul (KR)

(72) Inventor: Jay Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/246,166

(22) Filed: Jan. 11, 2019

(65) Prior Publication Data

US 2019/0165596 A1 May 30, 2019

Related U.S. Application Data

(63) Continuation of application No. 15/124,865, filed as application No. PCT/KR2015/002367 on Mar. 11, 2015, now Pat. No. 10,218,208.

(30) Foreign Application Priority Data

Mar. 11, 2014 (KR) .................. 10-2014-0028607

(51) Int. Cl.
*H02J 7/00* (2006.01)
*H02J 7/02* (2016.01)
(Continued)

(52) U.S. Cl.
CPC .............. *H02J 7/025* (2013.01); *H02J 5/005* (2013.01); *H02J 50/12* (2016.02); *H02J 50/40* (2016.02); *H02J 50/80* (2016.02); *H02J 50/90* (2016.02)

(58) Field of Classification Search
CPC ........ H02J 7/025; H01F 38/14; Y02T 90/122; B60L 11/182; Y02E 60/12
See application file for complete search history.

(56) References Cited

U.S. PATENT DOCUMENTS 8,704,534 B2 4/2014 Kim et al.
9,225,391 B2 12/2015 Bae
(Continued)

FOREIGN PATENT DOCUMENTS

CN 102969776 A 3/2013
CN 102971940 A 3/2013
(Continued)

OTHER PUBLICATIONS

International Search Report, issued in PCT/KR2015/002367, dated Jun. 29, 2015.

*Primary Examiner* — Arun C Williams
(74) *Attorney, Agent, or Firm* — Birch, Stewart, Kolasch & Birch, LLP

(57) ABSTRACT

A method of transferring wireless power using magnetic induction, can include selecting a coil among a plurality of coils partially overlapping each other; sensing a current flowing through the selected coil; receiving an amount of power requested by a wireless power receiver; and controlling an output voltage of a DC-DC converter based on the current flowing through the selected coil and the amount of power requested by the wireless power receiver, in which the controlling the output voltage of the DC-DC converter includes: dividing the output voltage of the DC-DC converter to generate a divided output voltage; and adjusting a level of the output voltage of the DC-DC converter with a feedback signal based on the divided output voltage, in which the dividing the output voltage includes damping the output voltage by a first resistor, a second resistor and a third resistor, and the first resistor is connected between an output terminal of the DC-DC converter and a feedback port of the DC-DC converter, the second resistor is connected between the feedback port of the DC-DC converter and ground, and
(Continued)

the third resistor is connected between a controller and the feedback port of the DC-DC converter.

16 Claims, 3 Drawing Sheets

(51) Int. Cl.
    *H02J 50/40*      (2016.01)
    *H02J 50/80*      (2016.01)
    *H02J 50/90*      (2016.01)
    *H02J 5/00*      (2016.01)
    *H02J 50/12*      (2016.01)

(56) References Cited

U.S. PATENT DOCUMENTS

| | | |
|---|---|---|
| 2009/0160533 A1 | 6/2009 | Lee |
| 2010/0134259 A1 | 6/2010 | Chiang |
| 2010/0264747 A1 | 10/2010 | Hall et al. |
| 2010/0277003 A1 | 11/2010 | Von Novak et al. |
| 2012/0049991 A1* | 3/2012 | Baarman .............. H02J 7/025 336/199 |
| 2012/0146425 A1 | 6/2012 | Lee et al. |
| 2012/0231731 A1 | 9/2012 | Kim et al. |
| 2013/0093425 A1* | 4/2013 | Chu ............... G01R 33/34084 324/318 |
| 2013/0214888 A1* | 8/2013 | Nogi ................ H01F 17/0013 336/192 |
| 2013/0342027 A1 | 12/2013 | Tsai et al. |

FOREIGN PATENT DOCUMENTS

| | | |
|---|---|---|
| CN | 103326475 A | 9/2013 |
| KR | 10-0880924 B1 | 2/2009 |
| KR | 10-2012-0102316 A | 9/2012 |
| KR | 10-2013-0045167 A | 5/2013 |

* cited by examiner

WIRELESS POWER TRANSFER SYSTEM HAVING WIRELESS POWER TRANSFER SYSTEM-CHARGER

CROSS REFERENCE TO RELATED APPLICATIONS

This application is a Continuation of U.S. patent application Ser. No. 15/124,865, filed on Sep. 9, 2016, which is the National Phase of PCT International Application No. PCT/KR2015/002367, filed on Mar. 11, 2015, which claims priority under 35 U.S.C. 119(a) to Patent Application No. 10-2014-0028607, filed in the Republic of Korea on Mar. 11, 2014, all of which are hereby expressly incorporated by reference into the present application.

TECHNICAL FIELD

The present invention relates to a wireless power transfer system including a wireless power transfer system-charger.

BACKGROUND ART

A wireless power transfer (WPT) system wirelessly transfers power through the air to maximize convenience of supply of power to mobile devices and digital appliances.

The WPT system has advantages such as energy conservation through real-time power use control, overcoming of power supply space restriction and reduction of the amount of waste batteries due to battery recharge.

The WPT system may be implemented using a magnetic induction method or a magnetic resonance method.

The magnetic induction method is non-contact energy transfer technology of placing two coils close to each other, enabling current to flow in one coil to generate a flux and generating electromotive force in the other coil due to the flux and may use a frequency of several hundred kHz.

The magnetic resonance method is magnetic resonance technology of utilizing an electric field or a magnetic field without using an electromagnetic wave or current, may transfer power over a distance equal to or greater than several meters, and may use a band of several tens of MHz.

Such a WPT system requires a direct current (DC) voltage.

Examples of a voltage supply for supplying an appropriate voltage to the WPT system include a DC-DC converter, an AC-DC power supply, a DC-AC inverter, etc.

The power supply is designed to satisfy high efficiency and low cost and a structure for changing the level of a necessary voltage is being developed using various methods.

In the WPT system, in power transfer efficiency, impedance matching, decision of a target wireless power transfer system-device, etc. between a wireless power transfer system-charger for transferring power and a wireless power transfer system-device for receiving power, it is important to change the level of the voltage of the power supply to generate a voltage necessary for the WPT system.

In the related art, since circuits for sensing the voltages or currents of coils included in a wireless power transfer system-charger and a wireless power transfer system-device and a circuit for controlling the level of a voltage according to communication between the wireless power transfer system-charger and the wireless power transfer system-device are separately provided, the volume of the system increases and complexity of the circuit increases.

In particular, in a DC-DC converter for outputting a constant voltage, the values of elements included in the converter should be changed in order to change the voltage. Therefore, complexity of the circuit is increased.

DISCLOSURE

Technical Problem

An object of the present invention is to provide a wireless power transfer system including a wireless power transfer system-charger capable of reducing an error of an output voltage of a DC-DC transformer and changing the level of the output voltage according to a power transfer method and efficiency.

Another object of the present invention is to provide a wireless power transfer system including a wireless power transfer system-charger capable of variably controlling an output control port of a controller so as to actively control the output of a DC-DC transformer regardless of characteristics of the DC-DC transformer.

Technical Solution

A wireless power transfer system-charger according to an embodiment of the present invention includes a power supply, a transformer unit for converting a voltage supplied by the power supply into a direct current (DC) voltage, and a controller for adjusting a level of the DC voltage of the transformer unit. The transformer unit includes a DC-DC converter and a control unit for receiving an output voltage of the DC-DC converter and adjusting the output voltage, and the control unit includes a divider for dividing the output voltage of the DC-DC converter.

In the wireless power transfer system-charger of the embodiment of the present invention, the controller may adjust the output voltage divided by the divider according to a wireless charging state to adjust the level of the DC voltage of the transformer unit.

In the wireless power transfer system-charger of the embodiment of the present invention, the controller may further include an output control port for outputting a controller output voltage and a resistor for connecting the output control port and the divider.

In the wireless power transfer system-charger of the embodiment of the present invention, the level of the DC voltage of the transformer unit may be adjusted in inverse proportion to the controller output voltage.

In the wireless power transfer system-charger of the embodiment of the present invention, the control unit may adjust the level of the DC voltage based on the divided voltage output from the divider.

In the wireless power transfer system-charger of the embodiment of the present invention, the controller may adjust the divided voltage.

In the wireless power transfer system-charger of the embodiment of the present invention, the control unit may include an error amplifier for comparing the divided voltage with a reference voltage and amplifying an error and a comparator for outputting a rectangular wave pulse corresponding to the output of the error amplifier.

In the wireless power transfer system-charger of the embodiment of the present invention, the divider may include a plurality of resistors for dividing the output voltage of the DC-DC converter and supplying the divided voltage to the error amplifier.

In the wireless power transfer system-charger of the embodiment of the present invention, the controller may include an output control port for adjusting the divided voltage.

In the wireless power transfer system-charger of the embodiment of the present invention, the divider may include a first resistor connected to an output terminal of the DC-DC converter and the error amplifier, a second resistor connected between the error amplifier and the ground, and a third resistor connected between the error amplifier and the output control port.

The wireless power transfer system-charger may further include a transmit antenna system, and the controller may adjust the divided voltage based on current flowing in the transmit antenna system.

In the wireless power transfer system-charger of the embodiment of the present invention, the controller may adjust the divided voltage based on communication information between the wireless power transfer system-charger and a wireless power transfer system-device for receiving power from the wireless power transfer system-charger.

In the wireless power transfer system-charger of the embodiment of the present invention, the DC-DC converter may be any one of a buck converter, a boost converter and a buck-boost converter.

A wireless power transfer system according to an embodiment of the present invention includes a wireless power transfer system-charger and a wireless power transfer system-device for receiving power from the wireless power transfer system-charger. The wireless power transfer system-charger includes a rectification and filtering unit for supplying a DC voltage to the transformer unit, a power converter for converting an output voltage of the transformer unit into an alternating current (AC) voltage, and a transmission-side matching unit for performing impedance matching between the wireless power transfer system-charger and the wireless power transfer system-device.

In the wireless power transfer system according to the embodiment of the present invention, the wireless power transfer system-device include a reception-side matching unit for performing impedance matching between the wireless power transfer system-charger and the wireless power transfer-device, a rectifier for rectifying an AC voltage output from an antenna system of the wireless power transfer system-device and generating a DC voltage, and a reception-side transformer for adjusting a level of the DC voltage output from the rectifier.

Advantageous Effects

According to the embodiments of the present invention, it is possible to provide a wireless power transfer system including a wireless power transfer system-charger capable of reducing an error of an output voltage of a DC-DC transformer and changing the level of the output voltage according to a power transfer method and efficiency. In addition, it is possible to provide a wireless power transfer system including a wireless power transfer system-charger capable of variably controlling an output control port of a controller so as to actively control the output of a DC-DC transformer regardless of characteristics of the DC-DC transformer.

BEST MODE

Figure 1:
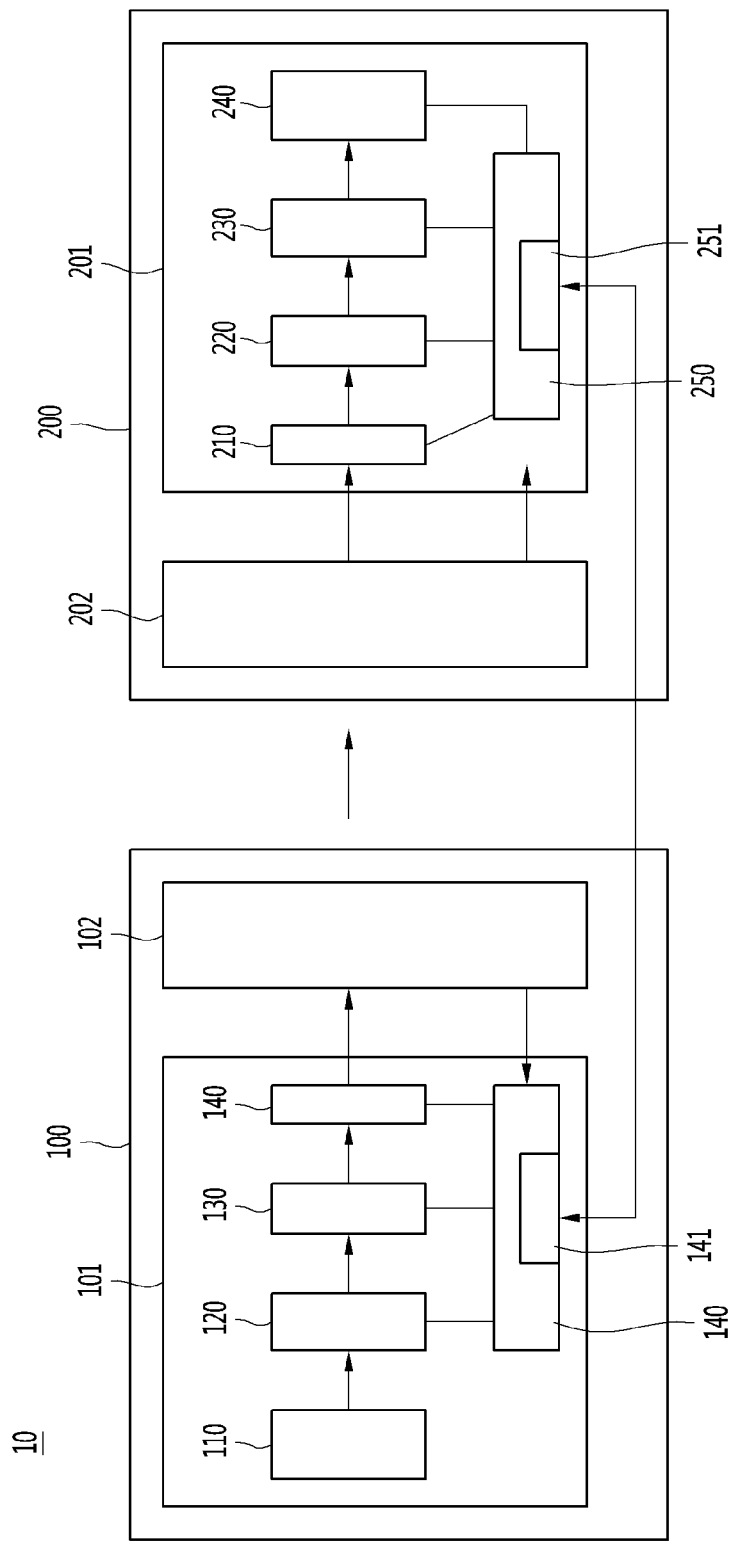
FIG. 1 is a block diagram showing a wireless power transfer system-charger and a wireless power transfer system-device of a wireless power transfer system according to an embodiment of the present invention.

Hereinafter, a wireless power transfer system including a wireless power transfer system-charger according to an embodiment of the present specification will be described in detail with reference to the accompanying drawings. The following embodiments are provided as examples in order to convey the spirit of the present invention to those skilled in the art. Accordingly, the present invention is not limited to the following embodiments and may be variously embodied. In the drawings, the sizes and thicknesses of devices are exaggerated for convenience. The same reference numbers will be used throughout the drawings to refer to the same or like parts.

Embodiments selectively use various types of frequency bands from a low frequency (50 kHz) to a high frequency (15 MHz) for wireless power transfer and requires support of a communication system capable of exchanging data and control signals for system control.

Embodiments are applicable to various fields such as the portable terminal industry, home appliance industry, electric vehicle industry, medical device industry and robot industry, all of which use batteries or electronic devices requiring batteries.

Embodiments may consider a system that is capable of transferring power to a number of equipment using one transmission coil that provides an equipment.

The terms and abbreviations used in the embodiments are as follows: Wireless power transfer system: system for wirelessly transferring power using a magnetic field.

Wireless power transfer system-charger (transmitter): device for wirelessly transferring power to power receivers of a plurality of devices in a magnetic field and managing an overall system.

Wireless power transfer system-device (receiver): device for wirelessly receiving power from a power transmitter in a magnetic field.

Charging area: Area for wirelessly transferring power in a magnetic field, which may be changed according to the size of an application product, required power and operating frequency.

FIG. 1 is a block diagram showing a wireless power transfer system-charger and a wireless power transfer system-device of a wireless power transfer system according to an embodiment of the present invention.

Referring to FIG. 1, the wireless power transfer system 10 according to the embodiment of the present invention may include a wireless power transfer system-charger 100 for wirelessly transferring power and a wireless power transfer system-device 200 for receiving power from the wireless power transfer system-charger 100.

A plurality of wireless power transfer system-devices 200 may be provided. The wireless power transfer system-charger 100 may transfer power to the wireless power transfer system-device 200 identified through an identification procedure with the wireless power transfer system-charger 100.

Referring to the block diagram of a subsystem of the wireless power transfer system-charger 100, the subsystem of the wireless power transfer system-charger 100 may include a transmit power converter system 101 and a transmit antenna system 102.

The transmit power converter system 101 may include a plurality of subsystems and each subsystem includes a rectification and filtering unit 110, a transformer unit 120, a power converter 130, a controller 140 and a matching unit (not shown).

The rectification and filtering unit 110 generates a DC voltage to be used for a next stage and provides the generated DC voltage to the transformer unit 120. Thereafter, power to be supplied to the transmit antenna system 120 is obtained.

The transformer unit 120 adjusts the level of the DC voltage output from the rectification and filtering unit 110 based on a control signal. The transformer unit converts the input DC voltage into a voltage having a rectangular shape using a semiconductor device such as a power transistor as a switch and then obtains a controlled DC output voltage through a filter.

At this time, the output DC voltage is controlled by controlling an ON or OFF period of the switch.

The transformer unit 120 basically performs DC-DC conversion and thus may be referred to as a switched-mode power supply (SMPS), a DC-DC transformer or a DC-DC converter.

The transformer unit 120 may have one of the characteristics of three converters including a buck converter for outputting an output voltage less than an input voltage, a boost converter for outputting an output voltage greater than an input voltage and a buck-boost converter having the above-described two characteristics.

The transformer unit 120 may control the level of the output DC voltage and the level of the DC voltage may be controlled by a control signal of the controller 140.

The controller 140 may be referred to as a microprocessor, a micro control unit or a microcomputer.

The controller 140 may control the level of the DC voltage output from the transformer unit 120 in consideration of maximum power transfer efficiency, power requirements of the wireless power transfer system-device 200 and the current charging amount of the wireless power transfer system-device 200.

In addition, the controller 140 controls overall operation of the wireless power transfer system-charger 100 using an algorithm, program or application required to control data read from a memory (not shown) of the wireless power transfer system-charger 100 in addition to adjustment of the output voltage of the transformer unit 120.

The transmit power converter system 101 may further include a transmission-side communication unit 141 and the transmission-side communication unit 141 may perform communication with a reception-side communication unit 251 of the wireless power transfer system-device 200.

The transmission-side and reception-side communication unit 141 and 251 may perform bidirectional communication in a predetermined manner and may perform communication using near field communication, ZigBee communication, infrared communication, visible-light communication, Bluetooth communication, Bluetooth low energy (BLE) communication, etc.

The transmission-side and reception-side communication unit 141 and 251 may transmit and receive power information to and from each other. The power information may include at least one of the capacity of the wireless power transfer system-device 200, residual battery, the number of times of charging, the amount of usage, the capacity of the battery and battery percent. In addition, the transmission-side communication unit 141 may transmit a charging function control signal for controlling the charging function of the wireless power transfer system-device 200.

The charging function control signal may control the wireless power transfer system-device 200 to enable or disable the charging function. Alternatively, the power information may include plug-in of a wired charging terminal, switching from an SA mode to an NSA mode, error state release, etc.

Although, in the figure, the transmit power converter system 101 is shown as being configured as a hardware module different from the transmission-side communication unit 141 such that the wireless power transfer system-charger 100 performs out-band communication, this is merely exemplary and the transmit power converter system 101 and the transmission-side communication unit 141 may be implemented as one hardware module such that the wireless power transfer system-charger 100 performs in-band communication.

The transmission-side communication unit 141 may be constructed separately from the controller 140. In the wireless power transfer system-device 200, the reception-side communication unit 251 may be included in or constructed separately from the controller 250 of the wireless power transfer system-device 200.

The power converter 130 may convert a DC voltage having a constant level into an AC voltage by a switching pulse signal having a band of several tens of KHz to several tens of MHz. That is, the power converter 130 may convert a DC voltage into an AC voltage and generate "wakeup power" or "charging power" used in the wireless power transfer system-device 200 in a target charging area.

Here, the wakeup power means low power of 0.1 to 1 mW and the charging power is power required to charge a battery of the wireless power transfer system-device 200 or power consumed for operation of the wireless power transfer system-device 200 and means high power of 1 mW to 200 W consumed in a load of the target wireless power transfer system-device 200.

The power converter 130 may include a power amplifier for amplifying the DC voltage output from the transformer unit 120 according to a switching pulse signal.

The power converter 130 may include a full-bridge or half-bridge inverter.

The matching unit (not shown) may be disposed at a next stage of the controller 140, include at least one of at least one passive element and at least one active element, and perform impedance matching between the wireless power transfer system-charger 100 and the wireless power transfer system-device 200 to maximize power transfer efficiency.

By controlling impedance viewed from the matching unit, power having high efficiency or a high level may be output. The matching unit may control impedance under control of the controller 140 and the transmission-side communication unit 141. In addition, the matching unit may include at least one of a coil and a capacitor. The controller 140 and the transmission-side communication unit 141 may control a connection state with at least one of the coil and the capacitor to perform impedance matching.

The transmit antenna system 102 may include at least one of an induction coil and a resonance coil.

The transmit antenna system 102 may include only an induction coil when the wireless power transfer system 10 transmits power only using a magnetic induction method, include only a resonance coil when the wireless power transfer system 10 transmits power only using a magnetic resonance method, and include the induction coil and the resonance coil when the wireless power transfer system 10 transmits power using a magnetic induction method and a magnetic resonance method.

A single induction coil or a single resonance coil may be provided or a plurality of induction coils or a plurality of resonance coils may be provided. If a plurality of induction coils or resonance coils is provided, the coils may overlap each other and the overlap area is determined in consideration of deviation of magnetic flux density.

The wireless power transfer system-device 200 may include a receive power converter system 201 and a receive antenna system 202.

The receive antenna system 202 of the wireless power transfer system-device 200 may be equal to the transmit antenna system 102 and the size of the receive antenna may be changed according to the electrical properties of the wireless power transfer system-device 200.

In addition, the receive antenna system 202 may receive power through a magnetic induction method or a magnetic resonance method. According to the power reception method, the receive antenna system 202 may include at least one of an induction coil or a resonance coil. The receive antenna system 202 may also include a near field communication antenna.

The receive power converter system 201 may include a matching unit 210, a rectifier 220, a reception-side transformer 230, a load 240 and a reception-side controller 250.

The reception-side controller 250 may include a reception-side communication unit 251 and the reception-side communication unit 251 may be configured separately from the controller 250.

The matching unit 210 may perform impedance matching between the wireless power transfer system-charger 100 and the wireless power transfer system-device 200.

The rectifier 220 rectifies an AC voltage output from the receive antenna system 202 and generates a DC voltage.

The reception-side transformer 230 may include a DC/DC converter and adjust the level of the DC voltage output from the rectifier 220 according to the capacity of the load 240. The load 240 may include a battery, a display, a sound output circuit, a main processor and various sensors.

The reception-side controller 250 may be activated by wakeup power from the wireless power transfer system-charger 100 to perform communication with the wireless power transfer system-charger 100 and to control operation of the subsystem of the wireless power transfer system-device 200.

A single or plurality of wireless power transfer system-devices 200 may simultaneously and wirelessly receive energy from the wireless power transfer system-charger 100. That is, in a resonance type wireless power transfer system, a plurality of target wireless power transfer system-devices 200 may receive power from one wireless power transfer system-charger 100.

At this time, the matching unit 150 of the wireless power transfer system-charger 100 may adaptively perform impedance matching among the plurality of wireless power transfer system-devices 200.

If a plurality of wireless power transfer system-devices 200 is provided, the same type or different types of systems may be configured.

Figure 2:
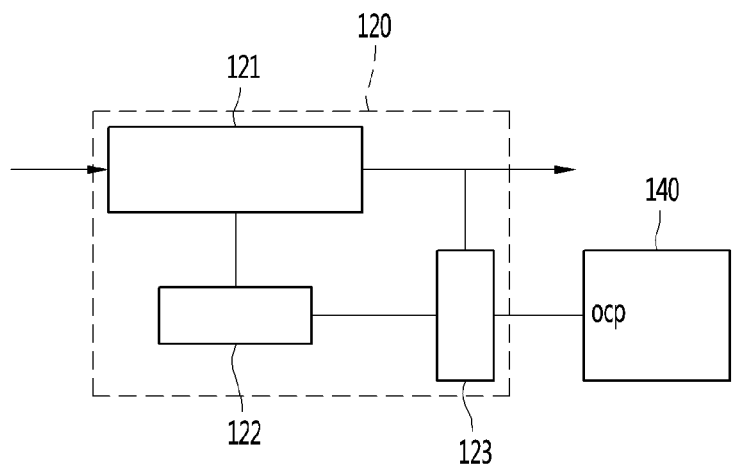
FIG. 2 is a diagram showing a transformer unit and a controller according to an embodiment of the present invention.

FIG. 2 is a diagram showing a transformer unit and a controller according to an embodiment of the present invention.

Referring to FIG. 2, the transformer unit 120 may include a transformer 121, a control unit 122 and a divider 123.

Although, in the figure, the divider 123 is included in the transformer unit 120, the present invention is not limited thereto and the divider and the transformer unit may be separately configured.

The control unit 122 is a device for regulating the output voltage of the transformer 121. The control unit may receive the divided voltage output from the transformer 121 and control an error of the output voltage.

The divider 123 may divide the output voltage of the transformer 121 and supply the divided voltage to the control unit 122.

The control unit 122 may supply a rectangular wave pulse (pulse width modulation (PWM) signal) having an adjusted pulse width to the transformer 121 based on the divided voltage from the divider 123. The transformer 121 may output a constant DC voltage, the level of which is adjusted with the pulse width of the rectangular wave pulse.

The divider 123 may be connected to an output control port (OUP) of the controller 140.

Figure 3:
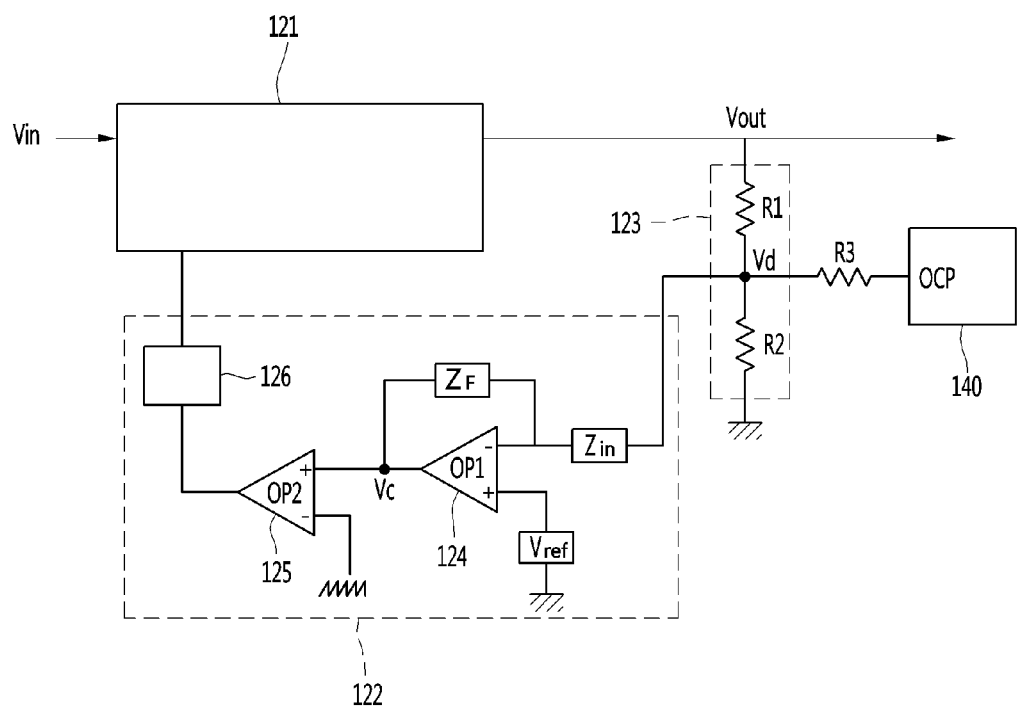
FIG. 3 is a diagram showing a subsystem of a control unit according to an embodiment of the present invention.

The controller 140 may adjust the value of the voltage of the input terminal of the control unit 122 to control the output voltage of the transformer 121. FIG. 3 is a diagram showing a subsystem of a control unit according to an embodiment of the present invention.

Referring to FIG. 3, the subsystem of the control unit 122 may include an error amplifier 124, a comparator 125 and a switch drive unit 126.

The error amplifier 124 amplifies the error of the output voltage Vout of the transformer 121 based on the divided voltage Vd of the divider 123 and output an amplified voltage Vc.

The error amplifier 124 may include a first operational amplifier OP1 having an inverting terminal for receiving the output voltage of the transformer 121 through the divider 123 and a non-inverting terminal for receiving a reference voltage Vref.

The error amplifier 124 compares the output voltage of the transformer 121 passing through the divider 123 and the reference voltage Vref, amplifies a generated error and outputs the amplified error to the comparator 125.

The comparator 125 generates a rectangular wave pulse based on the output voltage Vc of the error amplifier 124.

The comparator 125 may include a second operational amplifier OP2 having a non-inverting terminal for receiving the output voltage Vc of the error amplifier 124 and an inverting terminal for receiving a triangular wave.

The comparator 125 may compare the triangular wave and the output voltage Vc of the error amplifier 124, generate a rectangular wave pulse for driving the transformer 121, and adjusts the pulse width of the rectangular wave pulse in correspondence with the output error of the transformer 121, thereby stabilizing the output voltage Vout of the transformer 121.

The switch drive unit 126 may drive the transformer 121 based on the output of the comparator 125. That is, ON or OFF of the switch included in the transformer 121 may be controlled to constantly maintain the predetermined voltage of the transformer 121.

The control unit 122 and the transformer 121 are integrated to configure the transformer unit 120 in the form of an integrated chip (IC). The transformer unit 120 may be responsible for outputting a constant voltage in consideration of the error of the predetermined voltage. That is, when the output voltage Vout of the transformer 121 instantaneously increases to increase the divided voltage, the error increases. Information on such an error is fed back to decrease the output voltage Vout of the transformer 121. When the output voltage Vout of the transformer 121 instantaneously decreases to decrease the divided voltage Vd, the error increases. Information on such an error is fed back to increase the output voltage Vout of the transformer 121. Therefore, the output voltage Vout of the transformer 121 may be constantly maintained. However, if the output voltage Vout of the transformer unit 120 needs to be changed, a method of, at the controller 140, controlling the transformer unit 120 will be described.

The divider 123 may include a first resistor R1 connected to the input terminal (inverting terminal) of the error amplifier 124 and the output terminal of the transformer 121 and a second resistor R2 connected between the input terminal (inverting terminal) of the error amplifier 124 and the ground.

Although a relation in size between the first resistor R1 and the second resistor R2 is preferably R1<R2, the present invention is not limited thereto.

At this time, the divided voltage Vd of the transformer 121 may be changed according to the values of the first and second resistors R1 and R2. In principle, since the divided voltage Vd obtained by dividing the output voltage Vout of the transformer 121 by the first and second resistors R1 and R2 is compared with the reference voltage Vref and the error thereof is amplified, if the divided voltage Vd is less than the reference voltage Vref, the level of the output Vc of the error amplifier 124 increases with a ratio of feedback impedance Zf to input impedance Zin of the error amplifier 124, that is, Zf/Zin. In contrast, if the divided voltage Vd is greater than the reference voltage Vref, the level of the output Vc of the error amplifier 124 decreases with Zf/Zin.

Although the divided voltage Vd may be fixed according to the values of the first and second resistors R1 and R2, the divided voltage Vd may be adjusted to adjust the output voltage of the transformer 121.

This operation may be performed by the controller 140.

That is, the controller 140 needs to adjust the output voltage Vout of the transformer 121 according to a power transmit environment between the wireless power transfer system-charger 100 and the wireless power transfer system-device 200. At this time, since a third resistor R3 is connected between the OCP of the controller 140 and the input terminal (inverting terminal) of the error amplifier 124, the voltage output to the OCP may be adjusted to adjust the divided voltage Vd applied to the input terminal of the error amplifier 124.

The divided voltage Vd may be changed under control of the controller 140, and increase or decrease in the level of the output Vc of the error amplifier 124 may be controlled based on comparison between the divided voltage Vd and the reference voltage Vref.

The output Vc of the error amplifier 124 is compared with the triangular wave of the comparator 125. The comparator 125 generates a rectangular wave having an increased pulse width when the level of the output Vc of the error amplifier 124 increases and generates a rectangular wave having a decreased pulse width when the level of the output Vc of the error amplifier 124 decreases.

Since change in divided voltage Vd according to change in output voltage Vout of the transformer 121 is fed back to adjust the divided voltage Vd through the controller 140 regardless of a method of constantly maintaining the output voltage Vout of the transformer 121 at a target value, it is possible to adjust the target value of the output voltage Vout of the transformer 121 and to constantly maintain the target value of the output voltage Vout of the transformer 121 adjusted through the control unit 122. The controller 140 may freely control the output voltage Vout of the transformer 121 according to buck, boost and buck-boost properties.

Although a relation in size among the first to third resistors R1, R2 and R3 is R1<R3<R2, the present invention is not limited thereto.

Hereinafter, a method of setting the first to third resistors R1, R2 and R3 will be described in detail.

When the voltage output to the OCP of the controller 140 is referred to as a controller output voltage, the controller output voltage Vmcu may be determined according to the input voltage input to the controller 140. That is, when the input voltage input to the controller 140 is 3.3V, the controller output voltage Vmcu may be 0V (Vmcu_min) to 3.3V (Vmcu_max).

In addition, since the controller output voltage Vmcu and the output voltage Vout of the transformer 121 are inversely proportional to each other, when the controller output voltage Vmcu is a minimum value Vmcu_min, the output voltage Vout of the transformer 121 may become a maximum value Vout_max and, when the controller output voltage Vmcu is a maximum value Vmcu_max, the output voltage Vout of the transformer 121 may become a minimum value Vout_min.

The reference voltage Vref of the control unit 122 may be determined in consideration of the properties of the internal elements of the control unit 122. Although the reference voltage Vref may be set to 0.7V to 1.2V, the present invention is not limited thereto.

When Kirchhoff's law is applied to Vmcu_min and Vmcu_max at the node of the divided voltage Vd based on the above-described data, Equations 1 and 2 below are satisfied.

$$\frac{V_d - V_{mcu\_min}}{R_3} + \frac{V_d - V_{out\_max}}{R_1} + \frac{V_d}{R_2} = 0 \quad \text{Equation 1}$$

$$\frac{V_d - V_{mcu\_max}}{R_3} + \frac{V_d - V_{out\_min}}{R_1} + \frac{V_d}{R_2} = 0 \quad \text{Equation 2}$$

When a user selects a desired minimum value Vout_min and maximum value Vout_max of the output voltage Vout of the transformer 121 and the minimum value Vmcu_min and maximum value Vmcu_max of the controller output voltage Vmcu are determined, the first to third resistor values R1, R2 and R3 may be set using Equations 1 and 2 above. Alternatively, a user may select a desired minimum value Vout_min and maximum value Vout_max of the output voltage Vout of the transformer 121 and the first to third resistors R1, R2 and R3 and determine the minimum value Vmcu_min and maximum value Vmcu_max of the controller output voltage Vmcu using Equations 1 and 2 above. Therefore, as the controller output voltage Vmcu is adjusted within the range between the minimum value Vmcu_min and maximum value Vmcu_max of the controller output voltage Vmcu, the output voltage Vout of the transformer 121 may be adjusted. That is, since the controller 140 may adjust the controller output voltage Vmcu according to a wireless charging state to adjust the output voltage Vout of the transformer 121, the wireless charging state may be optimally applied.

Hereinafter, a method of, at the controller 140, controlling the output voltage of the transformer unit 120 through the output control port based on communication information between the wireless power transfer system-charger 100 and the wireless power transfer system-device 200 will be described.

First, a communication method of the transmission-side communication unit 141 and the reception-side communication unit 251 and a control method of the transmission-side controller 140 based on communication information will be described.

Figure 4:
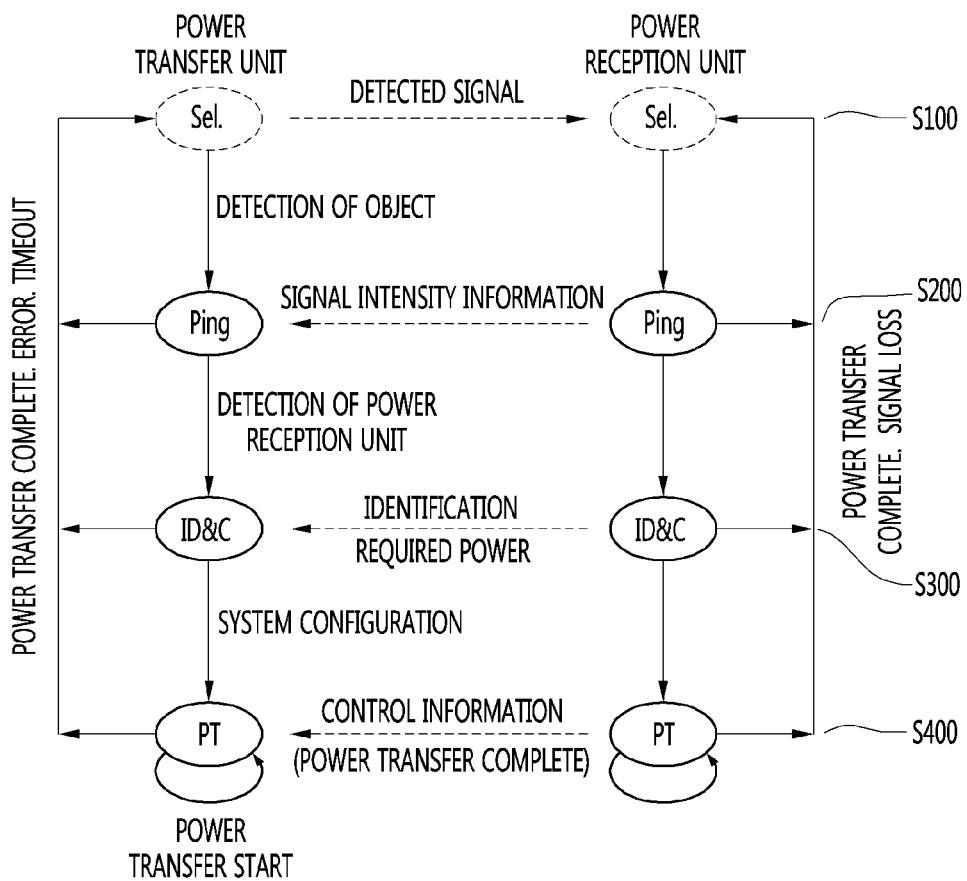
FIG. 4 is a diagram showing steps from a step of detecting a wireless power transfer system-device to a step of transferring power from a wireless power transfer system-charger to the wireless power transfer system-device.

FIG. 4 is a diagram showing steps from a step of detecting a wireless power transfer system-device to a step of transferring power from a wireless power transfer system-charger to the wireless power transfer system-device.

The control method is roughly divided into four steps including step S100 of detecting the wireless power transfer system-device 200 (selection), step S200 of confirming a response (ping), step S300 of performing identification and configuration (identification & configuration) and step S400 of transferring power (power transfer).

Step S100 of detecting the wireless power transfer system-device 200 is a step of the wireless power transfer system-charger 100 outputting a signal for detecting presence of the wireless power transfer system-device 200 and waiting for a response of the wireless power transfer system-device 200.

In step S200 of confirming the response, the wireless power transfer system-device 200 may transmit intensity information of the signal and the wireless power transfer system-charger 100 may confirm the presence of the wireless power transfer system-device 200 through the information.

In step S300 of performing identification and configuration, the wireless power transfer system-device 200 transmits identification and required power information and the wireless power transfer system-charger 100 generates power to be transferred and prepares to transfer power.

In step S400 of transferring power, the wireless power transfer system-device 200 transmits control information and the wireless power transfer system-charger 100 starts to transfer power.

If a signal is blocked or faulty during the four steps, the method may return to the first step. If abnormality is detected during transfer or if the wireless power transfer system-device 200 moves out of the charging area or is fully charged, the method may be finished and returned to the first step.

Figure 5:
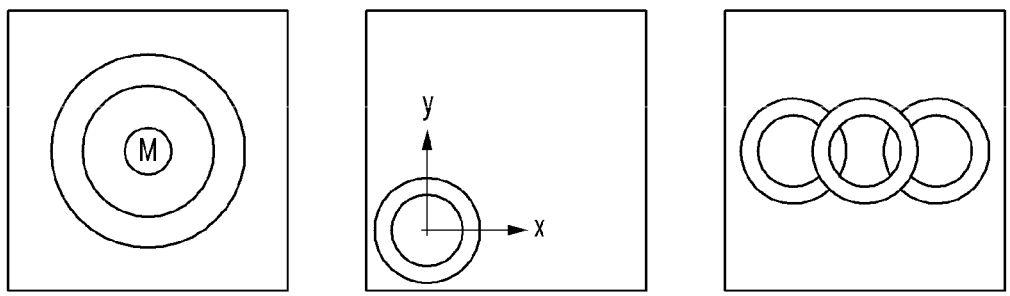
FIG. 5 is a diagram showing arrangement of coils of a transmission-side antenna system.

FIG. 5 is a diagram showing arrangement of coils of a transmission-side antenna system.

Hereinafter, a method of selecting a coil and controlling the transformer unit 120 based on current flowing in the selected coil will be described.

The transmit antenna system 102 may be of a fixed position type in which one coil is provided, a magnet is mounted at the center of the charging area and a charging position is fixed or a mobile coil type in which a coil may be moved in a two-dimensional xy plane of the charging area and an appropriate position of the wireless power transfer system-device 200 is selected.

In particular, in the case of a coil array type in which a plurality of coils partially overlaps each other, the step of detecting the device and the step of confirming the response, the presence of the wireless power transfer system-device 200 is confirmed and, at the same time, any one coil electrically connected to the wireless power transfer system-device 200 among the plurality of coils may be determined.

Using the property that the level of current flowing in each of the plurality of coils of the wireless power transfer system-charger 100 is changed according to the electrical connection between the plurality of coils and the coil of the wireless power transfer system-device 200, the controller 140 may sense current flowing in each of the plurality of coils of the wireless power transfer system-charger 100 to detect presence of the wireless power transfer system-device 200 in step S200 of confirming the response shown in FIG. 4, and the controller 140 may prepare to transfer power to the wireless power transfer system-device 200 in a manner of selecting a coil, in which largest current flows, in step S300 of performing identification and configuration. In the step of transferring power, the controller 140 may adjust the output voltage of the transformer unit 120 based on the power requirements of the wireless power transfer system-device 200.

In addition, according to the type or current charging state of the wireless power transfer system-device 200, in step S300 of performing identification and configuration shown in FIG. 4, the amount of power requested by the wireless power transfer system-device 200 to the wireless power transfer system-charger 100 may be changed. Therefore, the controller 140 needs to adjust the output voltage of the transformer unit 120 according to the power requirements, thereby generating power to be transferred.

In step S400 of transferring power shown in FIG. 4, current flowing in the selected coil may increase if impedance matching between the wireless power transfer system-charger 100 and the wireless power transfer system-device 200 is performed and may decrease if impedance matching is not performed. Therefore, the output voltage of the transformer unit 120 may be adjusted based on current flowing in the coil. Even when the coil is changed according to movement of the wireless power transfer system-device 200, the output voltage of the transformer unit 120 may be controlled based on current flowing in the changed coil.

In addition, when the controller 140 needs to sense current flowing in the coil of the wireless power transfer system-charger 100 to control the output voltage of the transformer unit 120 based on the sensed current and to control the output voltage of the transformer unit 120 based on power transfer information between the transmission-side communication unit 141 and the reception-side communication unit 152, the divided voltage of the divider 123 may be adjusted by adjusting the controller output voltage Vmcu of the controller 140.

The output voltage of the transformer unit 120 is determined under control of the controller 140. The error amplifier 124 and the comparator 125 of the transformer unit 120 may control the error such that the voltage determined through the above-described operation is constantly maintained.

The transformer unit 120 may be configured in the form of an integrated chip including the transformer 121 and the control unit 122 and the transformer 121 may be any one of a buck converter, a boost converter and a buck-boost converter. In this case, the output control port terminal of the controller 140 may be connected to the divider 123 and the voltage divided by the divider 123 is adjusted by the controller 140, thereby freely adjusting the output voltage of the transformer unit 120 according to the converter characteristics of the transformer unit 120.

The wireless power charging system may be mounted in a vehicle wireless charging system or a vehicle such as an electric vehicle (EV) or a plug-in hybrid vehicle in addition to a portable phone or a smartphone. In addition, the wireless power charging system may be mounted in an application for industrial machinery and a home appliance.

Examples of the industrial application include an electric tool, a wireless sensor, a slip ring (rotator) of an industrial motor, etc. In addition, examples of the home appliance include a TV, a digital camera, a game console, an electric toothbrush, a rechargeable battery, etc. The wireless power charging system is applicable to a non-contact IC card or a passive radio frequency identification (RFID) card.

Although the invention has been described with reference to the exemplary embodiments, the present invention is not limited thereto and those skilled in the art will appreciate that various modifications and variations can be made in the present invention without departing from the spirit or scope of the invention. For example, those skilled in the art may modify the components of the embodiments. Differences related to such modifications and applications are interpreted as being within the scope of the present invention described in the appended claims.

INDUSTRIAL AVAILABILITY

The wireless power transfer system including the wireless power transfer system-charger according to the present invention is available for a wireless charging system field.

The invention claimed is:

1. A method of transferring wireless power using magnetic induction, the method comprising:
   selecting a coil among a plurality of coils partially overlapping each other;
   sensing a current flowing through the selected coil;
   receiving an amount of power requested by a wireless power receiver; and
   controlling an output voltage of a DC-DC converter based on the current flowing through the selected coil and the amount of power requested by the wireless power receiver,
   wherein the controlling the output voltage of the DC-DC converter includes:
      dividing the output voltage of the DC-DC converter to generate a divided output voltage; and
      adjusting a level of the output voltage of the DC-DC converter with a feedback signal based on the divided output voltage,
   wherein the dividing the output voltage includes damping the output voltage by a first resistor, a second resistor and a third resistor, and
   wherein the first resistor is connected between an output terminal of the DC-DC converter and a feedback port of the DC-DC converter, the second resistor is connected between the feedback port of the DC-DC converter and ground, and the third resistor is connected between a controller and the feedback port of the DC-DC converter.

2. The method according to claim 1, wherein the level of the output voltage of the DC-DC converter is adjusted in inverse proportion to a voltage of the third resistor.

3. The method according to claim 2, wherein the first resistor, the second resistor and the third resistor are connected with an error amplifier, and
   wherein the error amplifier compares the divided output voltage with a reference voltage, amplifies an error between the divided output voltage and the reference voltage to generate an amplified error, and outputs the amplified error to a comparator.

4. The method according to claim 3, further comprising outputting, by the comparator, a rectangular wave pulse to the DC-DC converter based on the amplified error.

5. The method according to claim 1, wherein the amount of power requested by the wireless power receiver is changed according to a current charging state of the wireless power receiver.

6. The method according to claim 1, wherein the selecting the coil includes selecting a coil having a largest current flow among the plurality of coils.

7. The method according to claim 6, wherein the selected coil has a current flow that varies according to an electrical connection between the plurality of coils and a coil of the wireless power receiver.

8. The method according to claim 1, further comprising:
   converting the output voltage of the DC-DC converter into an alternating current (AC) voltage based on a switching pulse signal having a frequency of several hundred kHz.

9. The method according to claim 8, wherein the frequency remains constant while the output voltage of the DC-DC converter is adjusted.

10. A method of transferring wireless power using magnetic induction, the method comprising:
    selecting a coil among a plurality of coils partially overlapping each other;
    sensing a current flowing through the selected coil;
    receiving an amount of power requested by a wireless power receiver; and
    controlling an output voltage of a DC-DC converter based on the current flowing through the selected coil and the amount of power requested by the wireless power receiver,
    wherein the controlling the output voltage of the DC-DC converter includes:
       dividing the output voltage of the DC-DC converter to generate a divided output voltage; and
       adjusting a level of the output voltage of the DC-DC converter with a feedback signal based on the divided output voltage, and
    wherein the dividing the output voltage includes damping the output voltage by a first resistor connected to an output terminal of the DC-DC converter, a second resistor connected to ground, and a third resistor connected to a controller.

11. The method according to claim 10, wherein the first resistor, the second resistor and the third resistor are connected to an output node of a voltage divider.

12. The method according to claim 10, wherein the first resistor has a resistance lower than a resistance of the third resistor, and the resistance of third resistor is lower than a resistance of the second resistor.

13. The method according to claim 10, wherein the level of the output voltage of the DC-DC converter is adjusted in inverse proportion to a voltage of the third resistor.

14. A wireless power transmitter, comprising:
    a plurality of coils partially overlapping each other;
    a DC-DC converter connected to the plurality of coils;
    a voltage divider connected to the DC-DC converter; and
    a controller connected to the voltage divider,
    wherein the controller is configured to:
       select a coil among the plurality of coils,
       sense a current flowing through the selected coil,
       receive an amount of power requested by a wireless power receiver, and adjust an output voltage of the DC-DC converter based on the current flowing through the selected coil and the amount of power requested by the wireless power receiver, and wherein the voltage divider comprises:
  a first resistor connected between an output terminal of the DC-DC converter and a port of the DC-DC converter;
  a second resistor connected between the port of the DC-DC converter and ground; and
  a third resistor connected between a controller and the port of the DC-DC converter.

15. The wireless power transmitter according to claim 14, further comprising a DC-AC inverter configured to convert the output voltage of the DC-DC converter into an alternating current (AC) voltage based on a switching pulse signal having a frequency of several hundred kHz.

16. The wireless power transmitter according to claim 15, wherein the frequency remains constant while the output voltage of the DC-DC converter is varied by the controller.

* * * * *